(12) United States Patent
Wei et al.

(10) Patent No.: US 12,083,903 B2
(45) Date of Patent: Sep. 10, 2024

(54) RIDING MOWER

(71) Applicant: Globe (Jiangsu) Co., Ltd, Jiangsu (CN)

(72) Inventors: Qunli Wei, Jiangsu (CN); Wanzhao Yu, Jiangsu (CN); Qinghua Shi, Jiangsu (CN); Dongdong Shi, Jiangsu (CN); Fei Zhu, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 272 days.

(21) Appl. No.: 16/953,318

(22) Filed: Nov. 19, 2020

(65) Prior Publication Data

US 2021/0155099 A1     May 27, 2021

(30) Foreign Application Priority Data

Nov. 21, 2019     (CN) .......................... 201911148601.6

(51) Int. Cl.
| | | |
|---|---|---|
| *B60L 50/60* | (2019.01) | |
| *A01D 34/64* | (2006.01) | |
| *A01D 34/82* | (2006.01) | |
| *A01D 69/02* | (2006.01) | |
| *B60R 11/06* | (2006.01) | |
| *A01D 101/00* | (2006.01) | |

(52) U.S. Cl.
CPC .............. *B60L 50/66* (2019.02); *A01D 34/64* (2013.01); *A01D 34/82* (2013.01); *A01D 69/02* (2013.01); *B60R 11/06* (2013.01); *A01D 2101/00* (2013.01); *B60L 2200/40* (2013.01)

(58) Field of Classification Search
CPC ........ A01D 34/64; A01D 34/82; A01D 69/02; B60L 50/64; B60K 11/06
USPC ......................................................... 180/68.5
See application file for complete search history.

(56) References Cited

U.S. PATENT DOCUMENTS

| | | | | |
|---|---|---|---|---|
| 4,589,249 | A * | 5/1986 | Walker ................. | A01D 34/662 56/16.6 |
| 5,502,957 | A * | 4/1996 | Robertson .......... | A01D 34/6806 56/10.2 G |
| 5,540,037 | A * | 7/1996 | Lamb ..................... | A01D 34/44 D15/15 |
| 6,082,084 | A * | 7/2000 | Reimers ................. | A01D 69/02 56/10.8 |
| 8,240,414 | B2 * | 8/2012 | Sasahara ................ | A01D 34/78 701/22 |
| 8,578,687 | B2 * | 11/2013 | Ebihara .................. | A01D 34/78 56/17.1 |
| 9,288,942 | B2 * | 3/2016 | Moriguchi ............. | B60L 1/003 |
| 9,452,806 | B2 * | 9/2016 | Hirayama .............. | B62K 21/20 |
| 9,623,926 | B2 * | 4/2017 | Alink ...................... | B62J 1/005 |

(Continued)

*Primary Examiner* — Hau V Phan

(57) ABSTRACT

A riding mower, which comprises a wheel assembly, a body arranged on the wheel assembly and a battery assembly, the wheel assembly has a front wheel assembly provided with a front shaft and a front wheel and a rear wheel assembly provided with a pair of rear shafts and a pair of rear wheels. The battery assembly is mounted on the body, and a gravity center of the battery assembly is located between the front shaft and the rear shafts along a front to back direction. The riding mower of the present invention can enhance the driving stability of the riding mower and further solve the problems of easy head up and low efficiency of the existing riding mower.

16 Claims, 3 Drawing Sheets

(56) References Cited

U.S. PATENT DOCUMENTS

| | | | | |
|---|---|---|---|---|
| 9,867,331 B1* | 1/2018 | Siudyla | .................. | A01D 34/76 |
| 10,112,469 B2* | 10/2018 | Fujii | ...................... | A01D 69/02 |
| 10,602,660 B2* | 3/2020 | Manji | ..................... | B60L 15/08 |
| 10,667,467 B2* | 6/2020 | Kwok | ................... | H01L 33/502 |
| 11,317,564 B2* | 5/2022 | Conrad | .................. | A01D 34/78 |
| 2008/0099262 A1* | 5/2008 | Phillips | ............... | H01M 50/227 |
| | | | | 165/41 |
| 2010/0236845 A1* | 9/2010 | Ishii | ..................... | B60K 7/0007 |
| | | | | 74/606 R |
| 2011/0289896 A1* | 12/2011 | Sasahara | ................ | A01D 34/78 |
| | | | | 56/11.9 |
| 2012/0227368 A1* | 9/2012 | Koike | ................... | A01D 69/02 |
| | | | | 56/10.2 A |
| 2016/0183451 A1* | 6/2016 | Conrad | .................. | A01D 34/66 |
| | | | | 56/10.2 R |
| 2017/0055443 A1 | 3/2017 | Fujii et al. | | |
| 2018/0338414 A1 | 11/2018 | Manji et al. | | |
| 2018/0338420 A1 | 11/2018 | Manji et al. | | |
| 2019/0059227 A1 | 2/2019 | Conrad et al. | | |
| 2019/0200521 A1* | 7/2019 | Aboumrad | ........... | A01D 69/025 |

\* cited by examiner

RIDING MOWER

CROSS-REFERENCE TO RELATED INVENTIONS

This invention is a US invention which claims the priority of CN invention Serial No. CN201911148601.6, filed on Nov. 21, 2019, the disclosures of which are hereby incorporated by reference in their entirety.

TECHNICAL FIELD

The invention relates to a riding vehicle, especially a riding mower.

BACKGROUND ART

Similar to a traditional gasoline riding mower which places an engine at a tail of the mower, the current battery powered riding mower has a battery assembly located at the tail of the mower too, and an electronic control system located below a seat in the middle of the mower. In this configuration, the weight of a lithium battery assembly or a lead-acid battery assembly far exceeds the weight of the gasoline engine and the fuel, so that a center of the gravity of the battery powered riding mower shifts to the back relative to the traditional gasoline riding mower, and the front of the mower may head up when climbs a slope or suddenly starts. In order to solve the head up problem of the mower, it is common in the industry to add counterweight to the front of the mower to move the center of the gravity of the mower forwardly. By such arrangement, an invalid load of the riding mower is increased and the work efficiency of the riding mower is reduced. In addition, the electronic control system of the conventional battery powered riding mower is arranged under the seat, so that it is difficult to wire, debug, and maintain the electric control system due to a narrow space.

In view of this, there is a need for a new riding mower to solve above problems.

SUMMARY OF INVENTION

The object of the present invention is to provide a riding mower, which enables loads of front wheels and rear wheels to be evenly distributed by arranging a battery assembly in the middle of the riding mower, so that the driving stability of the riding mower is enhanced, and the problems of easy head up and low efficiency are solved.

To achieve the above object, the present invention provides a riding mower, comprising: a wheel assembly having a front wheel assembly and a rear wheel assembly, the front wheel assembly provided with a front shaft and a front wheel mounted to the front shaft, the rear wheel assembly provided with a pair of rear shafts and a pair of rear wheels mounted to the rear shafts respectively, a body arranged to the wheel assembly, a battery assembly mounted in the body, wherein a gravity center of the battery assembly being located between the front shaft and the rear shafts along a front to back direction.

As a further improvement of the present invention, the battery assembly is symmetrically distributed about a symmetry center line of the riding mower in the front to back direction.

As a further improvement of the present invention, the body comprises a base and a tail portion, the base is positioned between the front shaft and the rear shafts, the tail portion is positioned at a side of the rear shafts away from the front shaft, and the battery assembly is disposed in the base.

As a further improvement of the present invention, the body comprises a base and a tail portion, the base is positioned between the front shaft and the rear shafts, the tail portion is positioned at a side of the rear shafts away from the front shaft, and the tail portion is provided with an accommodating space.

As a further improvement of the present invention, the accommodating space comprises a case and a case cover pivotally to the case, and a tool box is disposed on the case cover and received in the case when the case cover is closed.

As a further improvement of the present invention, the tool box comprises a box fixedly installed on the case cover and a box cover pivotally installed to the box, and the box cover is perpendicular to the case cover.

As a further improvement of the present invention, the body is provided with a seat, the battery assembly is located beseech the seat.

As a further improvement of the present invention, the body is further provided with an operating component, and the operating component is located on one side or two sides of the seat.

As a further improvement of the present invention, a shock absorbing element is arranged on the bottom of the seat.

As a further improvement of the present invention, the body is further provided with a seat and a pedal; the seat is located at the tail portion, the pedal is located at the body, and the battery assembly is located between the pedal and the body.

To achieve the above object, the present invention also provides a riding vehicle, comprising a wheel assembly having front wheel assembly and a rear wheel assembly, the front wheel assembly provided with a front shaft and a front wheel mounted to the front shaft, the rear wheel assembly provided with a pair of rear shaft and a pair of rear wheels mounted to the rear shafts respectively, a body arranged to the wheel assembly, a battery assembly mounted in the body, and a gravity center of the battery assembly being located between the front shaft and the rear shafts along a front to back direction.

As a further improvement of the present invention, the battery assembly is symmetrically distributed about a symmetry center line of the riding mower in the front to back direction.

As a further improvement of the present invention, the body comprises a base and a tail portion, the base is positioned between the front shaft and the rear shafts, the tail portion is positioned at a side of the rear shafts away from the front shaft, and the battery assembly is disposed in the base.

As a further improvement of the present invention, the body comprises a base and a tail portion, the base is positioned between the front shaft and the rear shafts, the tail portion is positioned at a side of the rear shafts away from the front shaft, and the tail portion is provided with an accommodating space.

As a further improvement of the present invention, the accommodating space comprises a case and a case cover pivotally mounted to the case, and a tool box is disposed on the case cover and received in the case when the case cover is closed.

As a further improvement of the present invention, the tool box comprises a box fixedly installed on the case cover and a box cover pivotally installed to the box, and the box cover is perpendicular to the case cover.

As a further improvement of the present invention, the body is provided with a seat, the battery assembly is located beneath the seat As a further improvement of the present invention, the body is further provided with an operating component, and the operating component is located on one side or two sides of the seat.

As a further improvement of the present invention, a shock absorbing element is arranged on the bottom of the seat As a further improvement of the present invention, the body is further provided with a seat and a pedal; the seat is located at the tail portion, the pedal is located at the body, and the battery assembly is located between the pedal and the body.

The beneficial effect of the present invention is that: the riding mower of the present invention enables the loads of the front wheel and the rear wheel to be evenly distributed by arranging the battery assembly in the middle thereof, thereby enhancing the driving stability of the riding mower and further solving the problems of easy head warping and low efficiency of the existing riding mower.

DESCRIPTION OF EMBODIMENT

The exemplary embodiment will be described in detail herein, and the embodiment is illustrated in the accompanying drawings. When the following description refers to the drawings, unless otherwise indicated, the same numbers in different drawings indicate the same or similar elements. The embodiment described in the following exemplary embodiment does not represent all embodiments consistent with the present invention. On the contrary, they are only examples of devices, systems, machines and methods consistent with some aspects of the invention as detailed in the appended claims.

Figure 1:
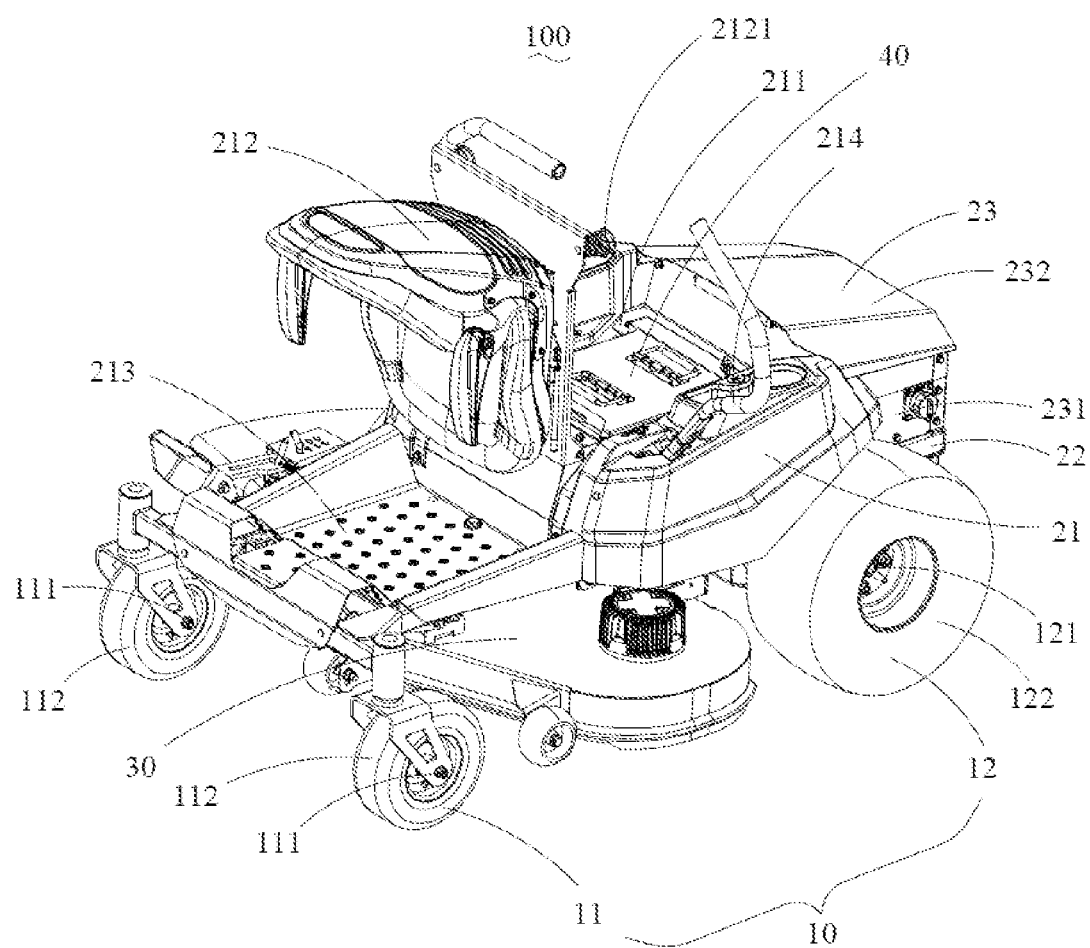
FIG. 1 is a perspective view of a riding mower according to one embodiment of the present invention.
Figure 2:
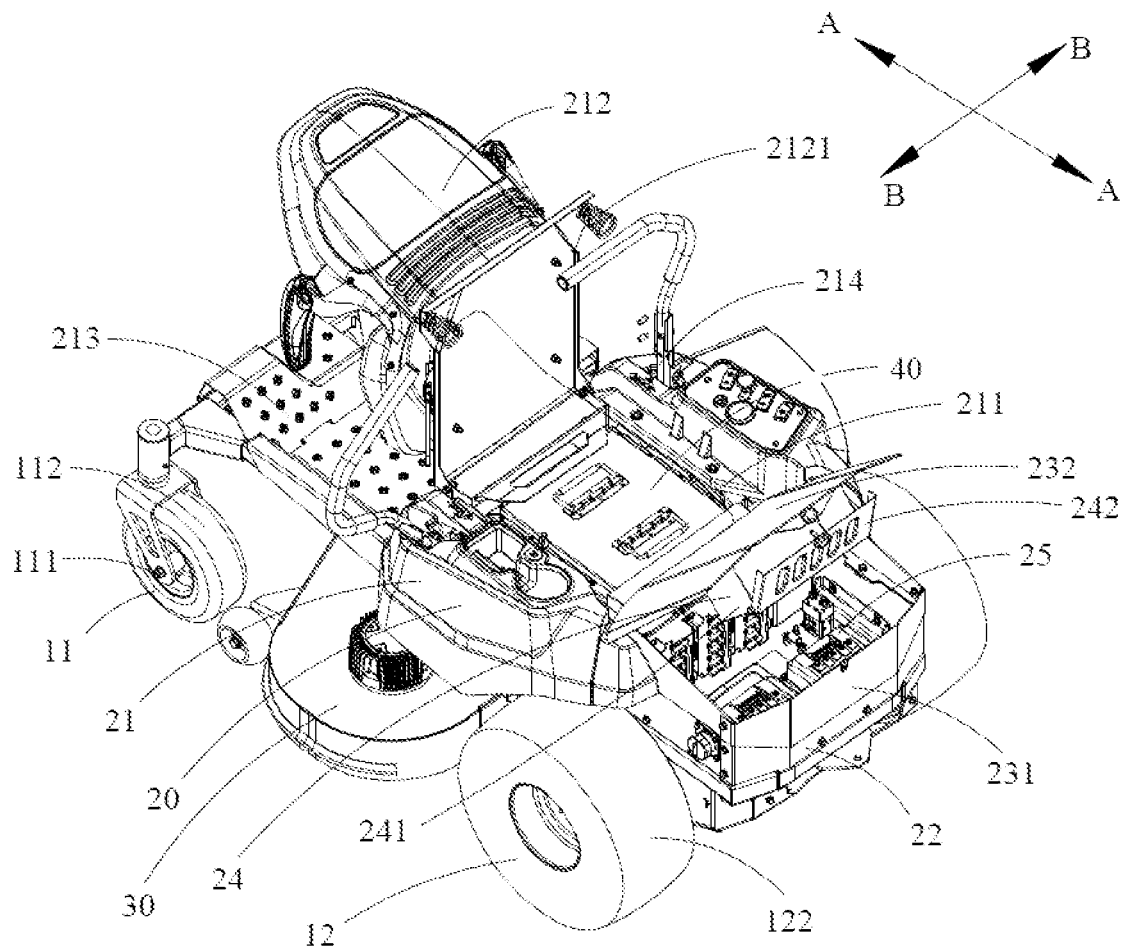
FIG. 2 is a perspective view of the riding mower according to one embodiment of the present invention, wherein a case cover is opened.

Referring to FIG. 1 and FIG. 2, the present invention discloses a riding mower 100 (hereafter refer to mower), which includes a wheel assembly 10, a body 20 mounted to the wheel assembly 10, a working assembly 30 mounted to the body 20 for performing specified function of the mower 100, a power mechanism for driving the wheel assembly 10 and the working assembly, and a battery assembly 40 for providing energy to the power mechanism. The present invention only takes the riding mower as an example, but is not limited to the riding mower. Other riding vehicles such as golf carts are within the protection scope of the present invention.

Referring to FIG. 1 and FIG. 2, the wheel assembly 10 has a front wheel assembly 11 and a rear wheel assembly 12 disposed opposite to the front wheel assembly 11. In present embodiment, the front wheel assembly 11 has a pair of front shafts 111 and a pair of front wheels 112 mounted to the front shafts 111, respectively. The rear wheel assembly 12 has a pair of rear shafts 121 and a pair of rear wheels 122 mounted to each of the rear shafts 121, respectively. As an alternative embodiment, the front wheel assembly 11 may only have one front shaft disposed in the middle of a font end of the riding mower 100, and a front wheel 112 mounted to the front shaft 111. In some embodiments, only the rear wheels 122 are driven by at least one driving motor (not shown) to rotate. In some embodiments, only the front wheels 112 are driven by at least one driving motor to rotate. In some embodiments, both the front wheels 112 and the rear wheels 122 are driven by at least one driving motor to rotate. In some embodiments, the driving motor may be in-wheel motor.

Referring to FIG. 1 and FIG. 2, the body 20 is mounted to the wheel assembly 10, and has a base 21 located between the front wheels 112 and the rear wheels 122, and a tail portion 22 located on a side of the rear shafts 121 away from the front shafts 111. The base 21 is provided with a receiving cavity 211, a seat 212, a pedal 213, and an operating component 214. The receiving cavity 211 is located between the pedal 213 and the tail portion 22 for receiving the battery assembly 40. The seat 212 is pivotally mounted on the top of the receiving cavity 211 by a pivot (not shown). A shock absorbing element 2121 is further disposed on the bottom of the seat 212 to prevent the user from being uncomfortable due to the shock generated during the traveling of the riding mower 100. In this embodiment, the shock absorbing element 2121 is a spring. Of course, the shock absorbing element 2121 may be other types, and the present invention is not limited thereto.

Figure 3:
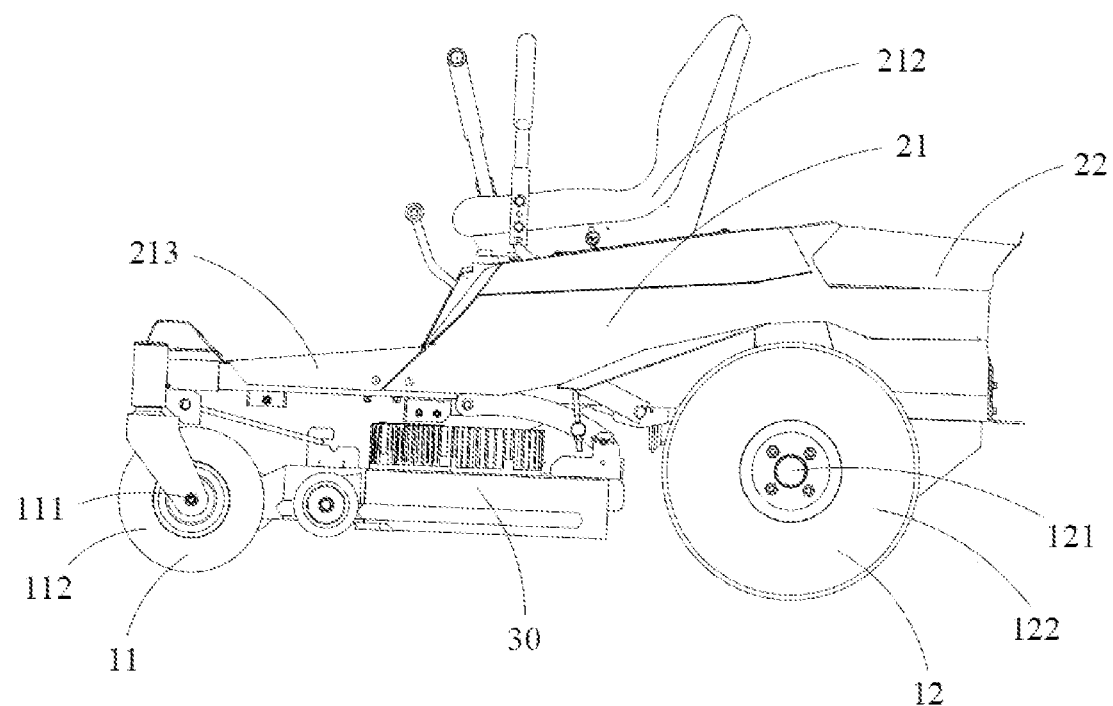
FIG. 3 is a side view of the riding mower according to one embodiment of the present invention.

When the seat 212 is in a first state (as shown in FIG. 3), the seat 212 is located above the receiving cavity 211 and can serve as a cover plate of the receiving cavity 211 to prevent the battery assembly 40 located in the receiving cavity 211 from being exposed to the outside, thereby protecting the battery assembly 40. When the seat 212 is rotated from the first state to a second state (as shown in FIG. 2), the seat 212 is located at a side of the receiving cavity 211 away from the tail portion 22, then the receiving cavity 211 is exposed to the outside, so that the user can put in or take out the battery assembly 40.

The pedal 213 is located on the front of the mower 100, so as to be stepped by feet of the user. When the seat 212 is in the second state, the seat 212 is positioned above the pedal 213. The operating component 214 is disposed on one side or both sides of the seat 212 for being operated by the user. The operating components 214 generally include a brake, a speed lever, an on-off switch, etc., which are well known in the art, and the present invention is not described in detail herein. The tail portion 22 is provided with an accommodating space 23 for accommodating various parts, tools, etc., and a tool box 24 for accommodating various tools. The accommodating space 23 has a case 231 and a case cover 232 pivotally mounted on the case 231. The case 231 can be made larger due to a larger space of the tail portion 22 so as to place more parts, tools and the like.

Preferably, the riding mower 100 is further provided with an electronic control box 25, and the electronic control box 25 is accommodated in the case 231. Such a setting can make full use of the advantage of the larger space of the tail portion 22 to facilitate wiring, debugging, maintenance and other operations. The tool box 24 includes a box body 241 and a box cover 242 pivotally mounted on the box body 241. In the present embodiment, the box body 241 of the tool box 24 is installed on a side of the case cover 232 facing the case 231, and the box cover 242 is perpendicular to the case cover 232. When the case cover 232 is closed, the tool box 24 is located within the case 231. However, in other embodiments, the tool box 24 may also be disposed on the tail portion 22 side by side with the accommodating space 23, in which case the tool box 24 is located outside the accommodating space 23. In some embodiments, the tool box 24 may be located in the case 231.

Referring to FIG. 1 and FIG. 2, the working assembly 30 is mounted on the bottom of the base 21, and has a working element (not shown). In this embodiment, the working element are cutting blades for mowing grass. However, it is to be understood that the working element is not limited to cutting blades. The power mechanism is mounted on the body 20 to drive the wheel assembly 10 and the working assembly 30. The power mechanism may be a motor and is shared by the wheel assembly 10 and the working assembly 30. Of course, the power mechanism may also be two motors, and drive the wheel assembly 10 and the working assembly 30, respectively. The battery assembly 40 is accommodated in the receiving cavity 211, and the center of the gravity of the battery assembly 40 is located between the front shafts 111 and the rear shafts 121 along a front to back direction A-A in FIG. 2. By such arrangement, the center of the gravity of whole riding mower 100 shifts forward, that makes the loadings of the front wheels 112 and the rear wheels 122 be distributed evenly so as to effectively promote a stability of the riding mower 100 in traveling and avoid heading up of the riding mower 100 when climbs a slope or suddenly starts. Meanwhile, due to such arrangement, the abrasion of the rear wheels 122 is far more than that of the front wheels 112 caused by the uneven load distribution of the front wheels 112 and the rear wheels 121 can be effectively avoided, so that a service life of the wheel assembly 10 is extended. This arrangement can also effectively avoid the uneven load distribution of the front wheels 112 and the rear wheels 122 from causing the rear wheels 122 to wear far greater than the front wheels 112, thereby increasing the service life of the wheel assembly 10. The load distributed on the rear wheels 122 is reduced and the wear of the rear wheels 122 caused by uneven distribution can be effectively avoided, thereby the service life of the wheel assembly is increased.

Moreover, as the gravity center of the whole riding mower 100 moves forward, a counterweight arranged on the front of the mower can be canceled and an invalid load of the riding mower 100 can be reduced, therefore a service efficiency of the riding mower 100 is improved. Preferably, the battery assembly 40 are symmetrically located about a symmetry center line of the mower 100 in the front to back direction A-A in FIG. 2, that is, the battery assembly 40 is disposed in the middle of the body 20. Such arrangement results in uniform loads on the pair of rear wheels 122.

In the present embodiment, the seat 212 and the pedal 213 are both provided on the base 21. However, in other embodiments, the seat 212 may be disposed on the tail portion 22, the pedal 213 is disposed on the base 21, and the battery assembly 40 is disposed between the pedal 213 and the base 21. Preferably, the projection of the gravity center of the battery assembly 40 on the axis plane is located in the middle of the front shafts 112 and the rear shafts 122 along the front to back direction A-A.

Compared with the prior arts, the riding mower 100 of the present invention enables the loads of the front wheel 112 and the rear wheel 122 to be evenly distributed by arranging the battery assembly 40 in the middle thereof, thereby enhancing the driving stability of the riding mower 100 and further solving the problems of easy head up and low efficiency of the existing riding mower.

The above embodiment is only used to illustrate the technical solution of the present invention and is not limiting. Although the present invention has been described in detail with reference to the preferred embodiment, those skilled in the art should understand that the technical solution of the present invention may be modified or equivalently replaced without departing from the spirit and scope of the technical solution of the present invention.

What is claimed is:

1. A riding mower, comprising:
   a wheel assembly consisting of a front wheel assembly and a rear wheel assembly, the front wheel assembly provided with a front shaft and a front wheel mounted to the front shaft, the rear wheel assembly provided with a pair of rear shafts and a pair of rear wheels mounted to the rear shafts respectively;
   a body arranged to the wheel assembly;
   a working assembly mounted to a bottom of the body, between the front wheel assembly and the rear wheel assembly; and
   a battery assembly mounted in the body and symmetrically distributed about a symmetry center line of the riding mower in a front to back direction;
   wherein a gravity center of the battery assembly as a whole is located between the front shaft and the rear shafts along the front to back direction;
   the body is provided with an entire seat located above the working assembly and directly above the battery assembly,
   when the entire seat is in a first state, the battery assembly is located beneath the entire seat and is not exposed to an outside;
   when the seat entire seat is rotated from the first state to a second state, the battery assembly is partially exposed to the outside;
   the entire seat is mounted on top of a receiving cavity in which the battery assembly is accommodated;
   the working assembly is mounted on a bottom of a base, which is provided with the receiving cavity and the entire seat, and the working assembly comprises a plurality of cutting blades; and
   the entire seat, the battery assembly, the receiving cavity, the working assembly and the cutting blades are all disposed in the middle of the front shaft and the rear shafts.

2. The riding mower according to claim 1, wherein the body comprises the base and a tail portion, wherein the base is positioned between the front shaft and the rear shafts, and the tail portion is positioned at a side of the rear shafts and away from the front shaft, and the battery assembly is disposed in the base.

3. The riding mower according to claim 2, wherein the body is further provided with a pedal, the pedal is located at the body, and the battery assembly is located between the pedal and the body.

4. The riding mower according to claim 1, wherein the body comprises the base and a tail portion, wherein the base is positioned between the front shaft and the rear shafts, and the tail portion is positioned at a side of the rear shafts and away from the front shaft, and the tail portion is provided with an accommodating space.

5. The riding mower according to claim 4, wherein the accommodating space comprises a case and a case cover pivotally mounted to the case, and a tool box is disposed on the case cover and received in the case when the case cover is closed.

6. The riding mower according to claim 5, wherein the tool box comprises a box fixedly installed on the case cover and a box cover pivotally installed to the box, and the box cover is perpendicular to the case cover.

7. The riding mower according to claim 1, wherein the body is further provided with an operating component, and the operating component is located on one side or two sides of the entire seat.

8. The riding mower according to claim 1, wherein a shock absorbing element is arranged on a bottom of the entire seat.

9. A riding vehicle, comprising:
   a wheel assembly consisting of a front wheel assembly and a rear wheel assembly, the front wheel assembly provided with a front shaft and a front wheel mounted to the front shaft, the rear wheel assembly provided with a pair of rear shaft and a pair of rear wheels mounted to the rear shafts respectively;
   a body arranged to the wheel assembly;
   a working assembly mounted to a bottom of the body, between the front wheel assembly and the rear wheel assembly; and
   a battery assembly mounted in the body and symmetrically distributed about a symmetry center line of the riding mower in a front to back direction;
   wherein a gravity center of the battery assembly as a whole is located between the front shaft and the rear shafts along the front to back direction;
   the body is provided with an entire seat located above the working assembly and directly above the battery assembly,
   when the entire seat is in a first state, the battery assembly is located beneath the entire seat and is not exposed to an outside;
   when the entire seat is rotated from the first state to a second state, the battery assembly is partially exposed to the outside;
   the entire seat is mounted on top of a receiving cavity in which the battery assembly is accommodated;
   the working assembly is mounted on a bottom of a base, which is provided with the receiving cavity and the entire seat, and the working assembly comprises a plurality of cutting blades; and
   the entire seat, the battery assembly, the receiving cavity, the working assembly and the cutting blades are all disposed in the middle of the front shaft and the rear shafts.

10. The riding vehicle according to claim 9, wherein the body comprises the base and a tail portion, wherein the base is positioned between the front shaft and the rear shafts, and the tail portion is positioned at a side of the rear shafts and away from the front shaft, and the battery assembly is disposed in the base.

11. The riding vehicle according to claim 10, wherein the body is further provided with a pedal, the pedal is located at the body, and the battery assembly is located between the pedal and the body.

12. The riding vehicle according to claim 9, wherein the body comprises the base and a tail portion, the base is positioned between the front shaft and the rear shafts, and the tail portion is positioned at a side of the rear shafts and away from the front shaft, and the tail portion is provided with an accommodating space.

13. The riding vehicle according to claim 12, wherein the accommodating space comprises a case and a case cover pivotally mounted to the case, and a tool box is disposed on the case cover and received in the case when the case cover is closed.

14. The riding vehicle according to claim 13, wherein the tool box comprises a box fixedly installed on the case cover and a box cover pivotally installed to the box, and the box cover is perpendicular to the case cover.

15. The riding vehicle according to claim 9, wherein the body is further provided with an operating component, and the operating component is located on one side or two sides of the entire seat.

16. The riding vehicle according to claim 9, wherein a shock absorbing element is arranged on a bottom of the entire seat.

\* \* \* \* \*